(12) United States Patent
Adderly et al.

(10) Patent No.: US 9,462,133 B2
(45) Date of Patent: *Oct. 4, 2016

(54) KEY CODE FOR A CONFERENCE OPERATION

(71) Applicant: International Business Machines Corporation, Armonk, NY (US)

(72) Inventors: Darryl M. Adderly, Morrisville, NC (US); Prasad Kashyap, Apex, NC (US); Brian J. Murray, Raleigh, NC (US); Wenjian Qiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,350

(22) Filed: Jul. 16, 2015

(65) Prior Publication Data

US 2015/0326730 A1    Nov. 12, 2015

Related U.S. Application Data

(63) Continuation of application No. 13/951,796, filed on Jul. 26, 2013, now Pat. No. 9,124,705.

(51) Int. Cl.
  *H04M 3/56* (2006.01)
(52) U.S. Cl.
  CPC .............. *H04M 3/563* (2013.01); *H04M 3/56* (2013.01); *H04M 3/561* (2013.01); *H04M 2201/16* (2013.01)

(58) Field of Classification Search
  CPC ...... H04M 3/56; H04M 3/563; H04M 3/564; H04M 3/565; H04M 3/567; H04M 3/568; H04M 2203/5054; H04M 2203/5063; H04M 2250/62; H04M 3/561; H04M 2201/16
  USPC ................. 370/260–262; 379/202.01–206.01
  See application file for complete search history.

(56) References Cited

U.S. PATENT DOCUMENTS

| | | |
|---|---|---|
| 2009/0220066 A1 | 9/2009 | Shaffer et al. |
| 2010/0220845 A1 | 9/2010 | Oliver et al. |
| 2011/0267987 A1 | 11/2011 | Asthana et al. |
| 2013/0251132 A1 | 9/2013 | Manor |
| 2014/0112211 A1 | 4/2014 | Walters |
| 2015/0030148 A1* | 1/2015 | Adderly .................. H04M 3/56 379/202.01 |

* cited by examiner

*Primary Examiner* — Harry S Hong
(74) *Attorney, Agent, or Firm* — Jordan IP Law, LLC

(57) ABSTRACT

Methods, products, apparatuses, and systems may facilitate a conference operation. The conference operation may include conference chaining, conference switching, conference modification, conference announcement, and so on. A collection of authentication data for a plurality of distinct conferences may be performed to chain the conferences. Switching among the distinct conference may be performed in response to a switch key code. The switch key code may include a general key code applicable to each of the conferences and/or a specific key code application to a specific conference.

23 Claims, 4 Drawing Sheets

Instruction 338: Welcome to the teleconferencing service. Enter your access code followed by the pound sign. To chain teleconferences for a general transfer operation, press *1.

Instruction 339: Enter as many conferences as desired, each separated by the * key. End the input with the # key.

Instruction 340: After each conference, do not hang up. Press *99 to switch to the next conference. You will be placed on hold until the current conference begins.

FIG. 3A

Instruction 341: Welcome to the teleconferencing service. Enter your access code followed by the pound sign... To chain teleconferences for a general toggle operation, press *2.

Instruction 342: Enter as many conferences as desired, each separated by the * key. End the input with the # key.

Instruction 343: To cycle through the conferences, do not hang up. Press *99 to switch to a different conference. You will be placed on hold until the current conference begins.

FIG. 3B

Instruction 344: Welcome to the teleconferencing service. Enter your access code followed by the pound sign... To chain teleconferences for a general transfer and toggle operation, press *3.

Instruction 345: Enter as many conferences as desired, each separated by the * key. End the input with the # key.

Instruction 346: After each conference, do not hang up. Press *98 to switch to the next conference. To cycle through the conferences, do not hang up. Press *97 to switch to a different conference. You will be placed on hold until the current conference begins.

FIG. 3C

Instruction 347: Welcome to the teleconferencing service. Enter your access code followed by the pound sign... To chain teleconferences for a specific toggle operation, press *4.

Instruction 348: Enter as many conferences as desired, each separated by a mapping key code such as *1* key for a first conference, *2* for a second conference, and so on. End the input with the # key.

Instruction 349: To cycle through the conferences, do not hang up. Press *1 to switch to the first conference and *2 to switch to the second conference. You will be placed on hold until the current conference begins.

FIG. 3D

KEY CODE FOR A CONFERENCE OPERATION

CROSS-REFERENCE TO RELATED APPLICATIONS

The present application is a continuation of U.S. patent application Ser. No. 13/951,796 filed on Jul. 26, 2013

BACKGROUND

Embodiments of the present invention generally relate to key codes for conference operations. More particularly, embodiments relate to performing a collection of authentication data for a plurality of distinct conferences to chain the conferences, and/or performing a switch among the distinct conferences in response to a switch key code.

A conference attendee may be required to dial a conference number multiple times and enter a corresponding access code for each conference which the conference attendee wishes to join. In addition, a single command (e.g., hold) may be unsuitable for switching among more than two conferences, such as audio conferences. Accordingly, the conference attendee may experience delay and/or inconvenience when accessing or switching conferences.

BRIEF SUMMARY

Embodiments may include a method involving performing a collection of authentication data for a plurality of distinct conferences to chain the conferences. The method may include performing a switch among the distinct conferences in response to a switch key code. In addition, the switch key code may include one or more of a general key code applicable to each of the conferences and a specific key code applicable to a specific conference.

Embodiments may include a method involving starting to perform a collection of authentication data for a plurality of distinct conferences to chain the conferences in response to an initiation key code, wherein the authentication data includes an access code. The method may include performing an identification of one or more of a buffer key code and a mapping key code interspersed with the authentication data, wherein the buffer key code includes a general key sequence demarcating the authentication data, and wherein the mapping key code includes a key sequence unique for the authentication data. In addition, the method may include ending the collection in response to a termination key code. The method may also include performing a switch among the distinct conferences in response to a switch key code, wherein the switch key code includes one or more of a general key code applicable to each of the conferences and a specific key code applicable to a specific conference.

The method may include one or more of queuing each access code, utilizing one of the queued access codes in response to the general key code to provide access to one of the conferences, and mapping the key sequence unique for the authentication data with the specific key code to provide access to the specific conference. The method may include performing one or more of an announcement including information corresponding to the plurality of distinct conferences, a modification in response to a modification key code, and a link between the switch key code and a physical hotkey of a conference device. In addition, the method may include prompting for one or more the initiation key code, the authentication data, the buffer key code, the mapping key code, and the termination key code.

Embodiments may include a computer program product having a computer readable storage medium and computer usable code stored on the computer readable storage medium. If executed by a processor, the computer usable code may cause a computer to perform a collection of authentication data for a plurality of distinct conferences to chain the conferences. The computer usable code, if executed, may also cause a computer to perform a switch among the distinct conferences in response to a switch key code. The switch key code may include one or more of a general key code applicable to each of the conferences and a specific key code applicable to a specific conference.

Embodiments may include a computer program product having a computer readable storage medium and computer usable code stored on the computer readable storage medium. If executed by a processor, the computer usable code may cause a computer to start to perform a collection of authentication data for a plurality of distinct conferences to chain the conferences in response to an initiation key code, wherein the authentication data is to include an access code. The computer usable code, if executed, may also cause a computer to perform an identification of one or more of a buffer key code and a mapping key code interspersed with the authentication data, wherein the buffer key code is to include a general key sequence to demarcate the authentication data, and wherein the mapping key code is to include a key sequence unique for the authentication data. The computer usable code, if executed, may also cause a computer to end the collection in response to a termination key code. The computer usable code, if executed, may also cause a computer to perform a switch among the distinct conferences in response to a switch key code, wherein the switch key code is to include one or more of a general key code applicable to each of the conferences and a specific key code applicable to a specific conference.

The computer usable code, if executed, may also cause a computer to perform one or more of queuing each access code, utilizing one of the queued access codes in response to the general key code to provide access to one of the conferences, and mapping the key sequence unique for the authentication data with the specific key code to provide access to the specific conference. The computer usable code, if executed, may also cause a computer to perform one or more of an announcement including information corresponding to the plurality of distinct conferences, a modification in response to a modification key code, and a link between the switch key code and a physical hotkey of a conference device. The computer usable code, if executed, may also cause a computer to prompt for one or more of the initiation key code, the authentication data, the buffer key code, the mapping key code, and the termination key code.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIGS. 3A to 3D are block diagrams of an example of a dialog including instructions to prompt for a key code according to an embodiment;

DETAILED DESCRIPTION

Figure 1:
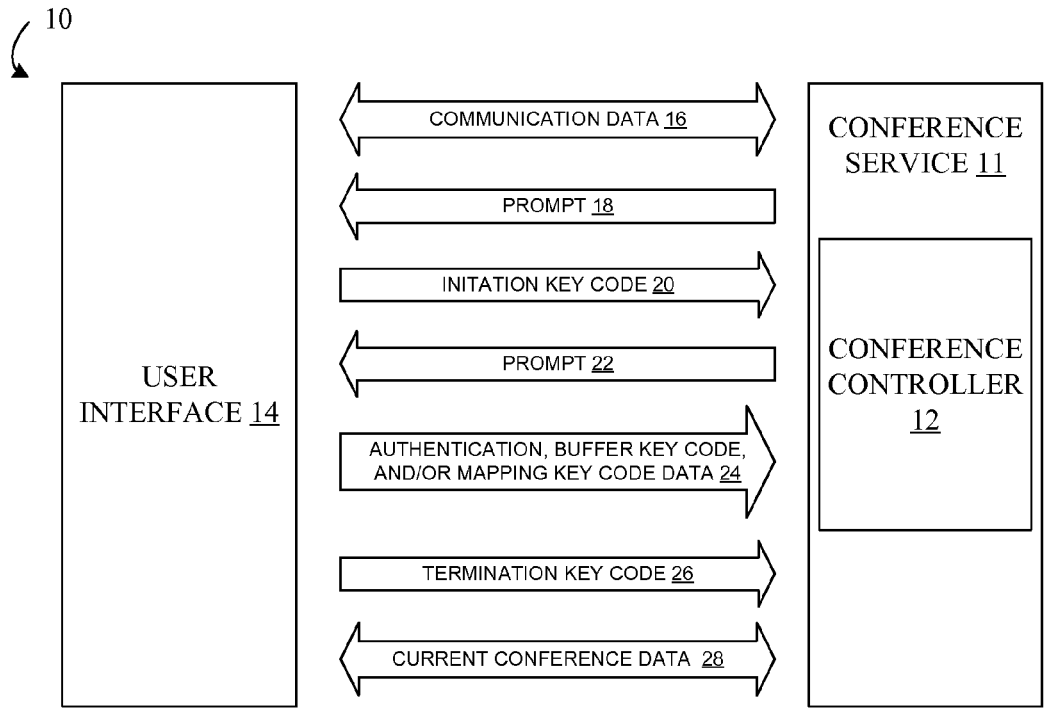
FIG. 1 is a block diagram of an example of a scheme to chain a plurality of conferences according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

When a conference attendee wishes to attend more than one conference, it may be valuable allow the attendee to dial a single conference number and enter a corresponding access code for each conference which the attendee wishes to join. In addition, it may be valuable to provide a relatively simple mechanism to switch between two or more conferences, such as a key code. Moreover, it may be valuable to provide a single key code which is suitable for switching among more than two audio conferences. It may be valuable for the key code to include a general key code applicable to each of the conferences, such as a single key code (e.g., a general hotkey) which may be utilized to transfer from one conference to a next succeeding conference in a chain of conferences, transfer to a conference spaced at a predetermined distance in the chain of conferences from a current conference, to cycle among conferences in the chain of conferences, and so on, or combinations thereof. It may also be valuable for the key code to include a specific key code applicable to a specific conference in the chain of conferences, such as a single unique key code (e.g., a specific hotkey) which may be utilized to switch from one conference to the specific conference in the chain of conferences.

Referring now to FIG. 1, a scheme 10 is shown to chain a plurality of conferences according to an embodiment. Each of the conferences may include a variety of functionality, such as audio functionality, video functionality, text functionality (e.g., Short Message Service), instant message (IM) text functionality, and so on, or combinations thereof. In addition, each of the conferences may be hosted by a conference service 11, which may include any entity (e.g., any apparatus) operable to facilitate communication between two or more parties (e.g., attendees) participating in a conference. The client service 11 may provide communication between the parties using any communication protocol. In one example, the conference service 11 may provide communication using H.323, Real Time Transfer Protocol (RTP), Session Initiation Protocol (SIP), Real Time Streaming Protocol (RTSP), Signaling System No. 7 (SS7, CCSS7, CCITT7, CCIS7, N7), and so on, or combinations thereof. Accordingly, the conference service 11 may host a teleconference, a video conference, a web conference, a voice over internet protocol (VoIP) conference, and so on, or combinations thereof.

In the illustrated example, the conference service 11 includes a conference controller 12, such as a server, an application, a plug-in (e.g., via an application programming interface (API)), and so on, or combinations thereof. It should be understood that the conference controller 12 may include a conference controller user interface (e.g., a command line interface, a graphical user interface (GUI), a hardwired keypad interface, etc.), which may be utilized to access one or more configurable settings to facilitate a conference operation. The settings may include options for a communication protocol (e.g., RTP, etc.), switching conferences (e.g., switch key codes, etc.), chaining conferences (e.g., buffer key code, mapping key code, etc.), prompting (e.g., prompting for data, key codes, etc.), data collection (e.g., authentication data, to queue, etc.), performing operations (e.g., transfer operation, toggle operation, modification operation, etc.), making announcements (e.g., announcing conference title, conference subject, etc.), and so on, or combinations thereof.

The attendee may access the plurality of conferences via a user interface 14. The user interface 14 may include any interface, such as a command line interface, a graphical user interface (GUI), a hardwired keypad interface, and so on, or combinations thereof. It should be understood that the user interface 14 may include the same and/or similar functionality as the conference controller user interface, described above. The user interface 14 may include, for example, a conference device such as a teleconferencing device (e.g., a public switched telephone network (PSTN) telephone), a VoIP device (e.g., a VoIP telephone), a SIP device (e.g., a SIP telephone), a personal computer (e.g., a tablet, a notebook, etc.), a mobile device (e.g., a smart phone), a web terminal (e.g., a device including a web browser), a video conferencing terminal (e.g., a device including a camera), an application, a plug-in (e.g., via an API), and so on, or combinations thereof. The conference controller 12 may, in one example, perform a link between a physical hotkey of a conference device and any desired key code, described below.

The attendee may access the plurality of conferences via the user interface 14. For example, the attendee may utilize the user interface 14 to establish and/or maintain a connection with the conference service 11 over a communication channel such as a transmission control protocol (TCP) channel, a user datagram protocol (UDP) channel, a PSTN channel, and so on, or combinations thereof. In one example, the attendee may utilize the user interface 14 to access the plurality of conferences by dialing a single conference number (e.g., a single 800 number) to establish a connection with the conference service 11, and by entering a corresponding access code (e.g., a pin number, a bridge number, etc.) for each conference which the attendee wishes to join. In the illustrated example, the conference service 11 and the interface 14 establish and/or maintain a connection using communication data 16, which may include a TCP SYNC, a TCP ACK, an UDP ACK, a dual-tone multi-frequency (DTMF) number, and so on, or combinations thereof.

The conference controller 12 issues a prompt 18 to the user interface 14 when the connection is established in the illustrated example. As described below, a prompt may include a dialog having instructions to prompt for a key code. It should be understood that a prompt, such as the prompt 18, is optional and that a key code may be input from the user interface 14 independently of any prompt. In the illustrated example, the prompt 18 causes the user interface 14 to return an initiation key code 20, which may include a key sequence of one or more keys (e.g., *1, *2, *3, *4, etc.). In one example, the attendee may enter the initiation key code 20 by inputting the key sequence of the key code 20 at the user interface 14. The initiation key code 20 may cause the conference controller 12 to start a collection of authentication data for the plurality of distinct conferences to chain the conferences. The authentication data may include, for example, an access code such as a pin number, a bridge number, a password, and so on, or combinations thereof. In the illustrated example, the initiation key code 20 causes the conference controller 12 to issue a prompt 22, which causes the user interface 14 to return data 24.

The data 24 may include authentication data for the plurality of distinct conferences interspersed with a buffer key code and/or a mapping key code. The conference controller 12 may perform an identification of authentication data, the buffer key code, and/or the mapping key code from the data 24. In one example, the conference controller 12 may identify preset authentication data in the data 24, consistencies and/or inconsistencies in the data 24 with respect to a configuration of authentication data, a preset buffer key code, a preset mapping key code, and so on, or combinations thereof. For example, the buffer key code (e.g., *) may be inconsistent with respect to the configuration (e.g., number, type, etc.) of authentication data (e.g., an access code of four numbers 1234), preset (e.g., preset as *), and so on, or combinations thereof. The buffer key code may include a general key sequence to demarcate the authentication data, for example to facilitate an identification of the beginning and/or the end of the authentication data. Accordingly, the key sequence of the buffer key code may be considered general since the key sequence may not be unique for specific authentication data. In one example, the buffer key code may reside in between each input of authentication data (e.g., 1234*5678) to demarcate the authentication data.

The mapping key code may also be inconsistent (e.g., number, type, etc.) with respect to the configuration of authentication data (e.g., an access code 8765). The mapping key code may include a key sequence (e.g., *1*) unique for authentication data (e.g., the access code 8765). Accordingly, the key sequence of the mapping key code may be considered specific since the key sequence may be unique for specific authentication data. In one example, the mapping key code may be preset (e.g., preset as *1* for a first conference associated with the access code 8765, preset as *2* for a second conference associated with an access code 4321, etc.), dynamically set (e.g., set in real-time using any desired key sequence inconsistent with authentication data), and so on, or combinations thereof. The conference controller 12 may also, for example, map the key sequence unique for the authentication data (e.g., *1*) with a specific key code, which may include a key sequence at least partially overlapping (e.g., *1, *1*) with the key sequence of the mapping key code (e.g., *1*). As described below, the specific key code may be used as a shortcut key to access a specific conference without disengaging the conference service.

In the illustrated example, the prompt 22 also causes the user interface 14 to return a termination key code 26, which may include a key sequence of one or more keys (e.g., #). In one example, the attendee may enter the termination key code 26 by inputting the key sequence of the termination key code 26 at the user interface 14. The termination key code 26 may cause the conference controller 12 to end the collection of authentication data from the data 24. As a result, the plurality of distinct conferences whose authentication data is collected may be chained in a chain of conferences. In addition, the authentication data may be queued. For example, the access code 1234 may be queued when the buffer key code * is input and/or encountered during the collection of the authentication data, and may remain queued with the access code 5678 when the collection of the authentication data has ended.

In the illustrated example, the conference service 11 exchanges current conference data 28 with the interface 14 when the conference controller 12 causes the attendee to be placed in a conference (a current conference). The current conference data 28 may include any data for the current conference, such as audio data, video data, text data, and so on, or combinations thereof. At least a part of the conference data 28 may be filtered at any time, for example by muting audio and/or blocking video at any time using the conference controller 12, the user interface 14, and so on, or combinations thereof. The current conference may be automatically and/or manually selected based on any criteria, such as the authentication data first input and/or encountered, authentication data first enqueued, a user preference (e.g., rating information, thumbs up, etc.) for a conference, a conference start time, a conference end time, a user selection, and so on, or combinations thereof. In one example, authentication data (e.g., the access code 1234) enqueued first may be dequeued and utilized when the collection has ended to automatically place the attendee in the current conference while other authentication data (e.g., the access code 5678) collected may remain queued.

Figure 2:
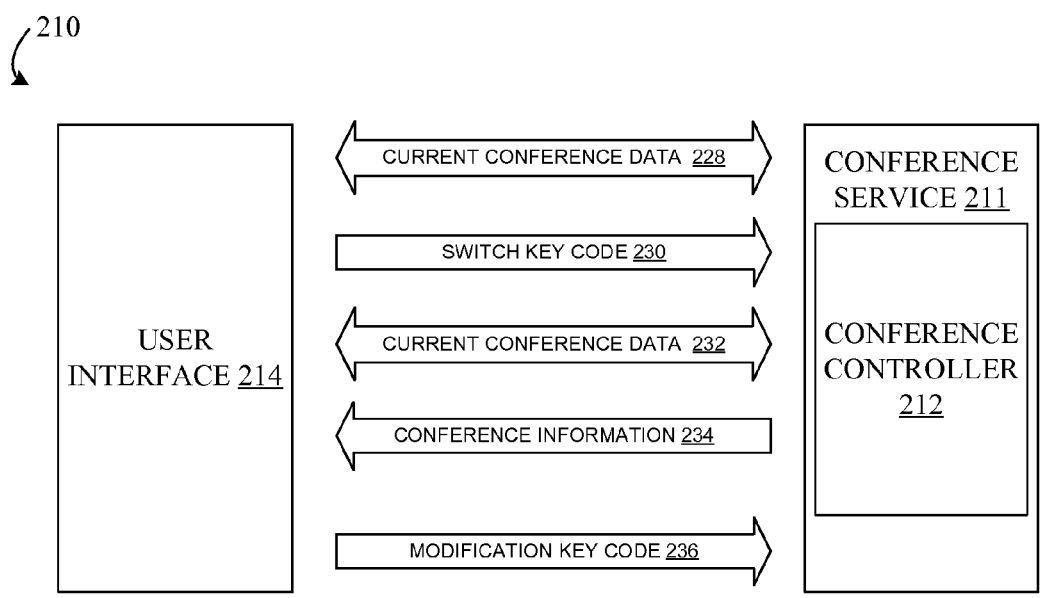
FIG. 2 is a block diagram of an example of a scheme to switch among a plurality of conferences and/or to modify a chain of conferences according to an embodiment.

FIG. 2 shows a scheme 210 to switch among the plurality of conferences and/or to modify a chain of conferences according to an embodiment. It should be understood that elements identified in the scheme 210 of FIG. 2 having similar reference numerals as those already discussed in the scheme 10 of FIG. 1 are to be understood to incorporate similar functionality. Accordingly, in one example, the attendee may be placed in a current conference (e.g., the conference associated with the access code 1234) and a conference service 211 may exchange current conference data 228 with a user interface 214. In the illustrated example, the user interface 214 issues a switch key code 230 to the conference controller 212. In one example, the attendee may enter the switch key code 230 by inputting the key sequence of the switch key code 230 at the user interface 214. Moreover, the conference controller 212 may perform a link between the switch key code 230 and a physical hotkey on a keypad of a conference device such as a VoIP device, for example to perform a switch operation when the physical hotkey is utilized.

The switch key code 230 may include one or more of a general key code applicable to each of the conferences and a specific key code applicable to a specific conference. In one example, the switch key code 230 may include a general key sequence of one or more keys (e.g., a general hotkey *99) applicable to each of the conferences. Accordingly, a single general key sequence (e.g., *99) may cause the conference controller 212 to perform a conference operation, such as switching from the current conference (e.g., the conference associated with the access code 1234) to another conference (e.g., the conference associated with the queued conference code 5678). The conference operation (e.g., a switch operation) may include a transfer from the current conference to a next succeeding conference in the chain of conferences when the current conference has ended, a transfer to one other conference spaced at a predetermined distance in the chain of conferences from the current conference when the current conference has ended (e.g., a forward move by one conference, a backward move by two conferences, etc.), a cycle among conferences in the chain of conferences at any time (e.g., forward move at any time, backward move at any time, etc.), and so on, or combinations thereof.

In addition, a plurality of general key sequences may be employed to cause a plurality of conference operations. In one example, a general key code *98 may be used in a switch operation to transfer access from the current conference to a next succeeding conference in the chain of conferences when the current conference has ended, while a general key code *97 may be used in a switch operation to cycle among conferences in the chain of conferences at any time. Accordingly, the conference operation may be implemented using the general key code without disengaging the conference service 211, without disengaging the conference controller 212, without requiring redialing a conference number, without reentering authentication data, and so on, or combinations thereof.

In another example, the switch key code 230 may include a specific key code applicable to a specific conference in the chain of conferences. For example, the switch key code 230 may include a single unique key sequence (e.g., a specific hotkey *2) which may be utilized in a switch operation to toggle from a current conference (e.g., a conference associated with the access code 4321) to a specific other conference in the chain of conferences (e.g., a conference associated with the access code 8765). The switch key code 230 may also include a single unique key sequence (e.g., a specific hotkey *1) which may be utilized in a switch operation to toggle from a current conference (e.g., the conference associated with the access code 8765) to another specific conference in the chain of conferences (e.g., the conference associated with the access code 4321). In a further example, the single unique key sequence (e.g., the specific hotkey *1) may be utilized in a switch operation to toggle from a current conference (e.g., the conference associated with the access code 5678) to a specific conference in the chain of conferences (e.g., the conference associated with the access code 4321).

To minimize confusion, the unique key sequence of the switch key code 230 may at least partially overlap with the key sequence of the mapping key code. For example, the unique key sequence *1 may be utilized to provide access to the specific conference associated with the access code 4321, which may partially overlap with the mapping key code *1*, while the unique key sequence *2 may be utilized to provide access to the specific conference associated with the access code 8765, which may partially overlap with the mapping key code *2*. Accordingly, the conference operation may be implemented using the specific key code without disengaging the conference service 211, without disengaging the conference controller 212, without redialing a conference number, without reentering authentication data, and so on, or combinations thereof. In the illustrated example, the conference controller 212 identifies the switch key code 230 and/or performs one or more switch operations to provide access to one or more other conferences in the chain of conferences.

The conference service 211 exchanges conference data 232 with the user interface 214 for the newly accessed conference, which may include audio data, video data, text data, and so on, or combinations thereof. At least a part of the conference data 232 may be filtered at any time, for example by muting audio and/or blocking video at any time using the conference controller 212, the user interface 214, and so on, or combinations thereof. Accordingly, the newly accessed conference may be treated as the current conference by the conference controller 212 for the purpose of handling a subsequent conference operation.

The conference controller 212 may make/perform an announcement including information corresponding to the plurality of distinct conferences. In one example, the announcement may be performed at any time, such as when the attendee is placed into the current conference, when the conference controller 212 performs a conference operation (e.g., a switch operation), in response to a key code from the user interface 214 (e.g., an announcement key code which may be entered by the attendee, not shown), and so on, or combinations thereof. The information may include any data to identify the current conference, such as the conference title, the conference subject, the conference agenda, the location of the conference in the agenda, and so on, or combinations thereof. Participant information may also be included, such as the identity of arriving attendees, the identity of the conference chair, the identity of an organization sponsoring the conference, and so on, or combinations thereof.

The information in the announcement may include any data type, such as audio data, video data, text data, and so on, or combinations thereof. At least a part of the information may be filtered at any time, for example by muting audio and/or blocking text at any time using the conference controller 212, the user interface 214, and so on, or combinations thereof. Accordingly, the attendee may become aware of, and/or be able to confirm, the identity of current conference to determine if the attendee wishes to participate in the current conference, to remain in the current conference, and so on, or combinations thereof. In the illustrated example, the conference controller 212 issues conference information 234 to the user interface 214, which includes one or more of the title of the conference and the subject of the current conference, when the attendee is placed in the current conference as a result of the switch operation by the conference controller 212.

The conference controller 212 may also perform a modification to the chain of conferences in response to a modification key code 236. In the illustrated example, the user interface 214 issues the modification key code 236 to the conference controller 212, which may be entered by the attendee by inputting the key sequence of the modification key code 236 at the user interface 214. The modification key code 236 may be issued at any time, such as during the collection of the authentication data, after the collection of the authentication data, and so on, or combinations thereof. The modification key code 236 may cause the conference controller 212 to add a conference to the chain of conferences, to delete a conference in the chain of conferences, to reorder the conferences (e.g., each of the conferences, a subset, etc.) in the chain of conferences, and so on, or combinations thereof.

In one example, the conference controller 212 may prompt for data corresponding to a modifying conference (e.g., a conference to be added, deleted, reordered, etc.) to perform the modification, may receive the data corresponding to the modifying conference automatically, and so on, or combinations thereof. The conference controller 212 may utilize a sequence number and/or a specific key code of the modifying conference to identify a conference to add, to delete, to reorder, and so on, or combinations thereof. The conference controller 212 may delete and/or reorder the current conference (e.g., the conference in which the attendee is placed) automatically when the modification key code 236 is input and/or encountered. The conference controller 212 may utilize authentication data (e.g., new authentication data for a new conference, prior authentication data for a conference in the chain of conferences, etc.) to identify a conference to add, to delete, to reorder, and so on, or combinations thereof.

Turning now to FIGS. 3A to 3D, an example of a dialog 310 including instructions 338 to 349 is shown to prompt for a key code according to an embodiment. The information included in the dialog 310 may include any data type, such as audio data, video data, text data, and so on, or combinations thereof. In the illustrated example of FIG. 3A, the dialog 310 includes the instruction 338, which prompts for an access code to immediately place the attendee in a conference and/or an initiation key code *1 to chain a plurality of distinct conferences. The instruction 339 prompts for authentication data (e.g., a pin number, a bridge number, etc.) interspersed with a buffer key code *. The instruction 339 also prompts for a termination key code #. In one example, the attendee may enter the initiation key code *1, the authentication data, the buffer key code *, and/or the termination key code # at a user interface, such as teleconferencing device. Accordingly, a collection of the authentication data for the plurality of distinct conferences may be performed to chain the conferences. The instruction 340 may instruct the attendee for a general transfer operation, such as when the attendee wishes to transfer from a current conference to one other conference when the current conference ends. In one example, a general key code *99 may be utilized to switch to a next succeeding conference when the current conference ends without the need to disconnect form the conference service.

In the illustrated example of FIG. 3B, the dialog 310 includes the instruction 341, which prompts for an initiation key code *2. The instruction 342 prompts for authentication data (e.g., a pin number, a bridge number, etc.) interspersed with the buffer key code *. The instruction 342 also prompts for a termination key code #. In one example, the attendee may enter the initiation key code *2, the authentication data, the buffer key code *, and/or the termination key code # at the user interface, such as the teleconferencing device. Accordingly, a collection of the authentication data for the plurality of distinct conferences may be performed to chain the conferences. The instruction 343 may instruct the attendee for a toggle operation, such as when the attendee wishes to toggle from a current conference to another conference at any time. For example, the general toggle operation may cycle among conferences which are spaced at predetermined distance. In one example, a general key code *99 may be utilized to move forward one conference in the chain of conferences at any time without the need to disconnect form the conference service.

In the illustrated example of FIG. 3C, the dialog 310 includes the instruction 344, which prompts for an initiation key code *3. The instruction 345 prompts for authentication data (e.g., a pin number, a bridge number, etc.) interspersed with the buffer key code *. The instruction 345 also prompts for a termination key code #. In one example, the attendee may enter the initiation key code *3, the authentication data, the buffer key code *, and/or the termination key code # at the user interface, such as the teleconferencing device. Accordingly, a collection of the authentication data for the plurality of distinct conferences may be performed to chain the conferences. The instruction 346 may prompt the attendee for a general transfer operation and/or a general toggle operation. In one example, a general key code *98 may be utilized to switch to a next succeeding conference when the current conference ends without the need to disconnect form the conference service, while the general key code *97 may be utilized to move forward one conference in the chain of conferences at any time without the need to disconnect form the conference service.

In the illustrated example of FIG. 3D, the dialog 310 includes the instruction 347, which prompts for an initiation key code *4. The instruction 348 prompts for authentication data (e.g., a pin number, a bridge number, etc.) interspersed with a mapping key code, such as *1*, *2*, etc., which may be preset (e.g., provided by the conference service) and/or dynamically set (e.g., set in real-time by the attendee, identified, and stored by a conference controller). The instruction 348 also prompts for a termination key code #. In one example, the attendee may enter the initiation key code *4, the authentication data, the mapping key codes *1*, *2*, etc., and/or the termination key code # at the user interface, such as the teleconferencing device. Accordingly, a collection of the authentication data for the plurality of distinct conferences may be performed to chain the conferences. The instruction 349 may instruct the attendee for a specific toggle operation, such as when the attendee wishes to transfer from a current conference to another specific conference at any time.

In one example, a specific key code *1 may be utilized to switch to a specific conference (e.g., the first conference) corresponding to authentication data associated with the mapping key code *1*, a specific key code *2 may be utilized to switch to a specific conference (e.g., the second conference) corresponding to authentication data associated with the mapping key code *2*, and so on, or combinations thereof. In addition, when the attendee is placed on hold until the current conference begins, information corresponding to the current conference may be announced to the attendee, such as the conference title, the conference subject, and so on, or combinations thereof.

Further instructions may be provided at any time and/or for any conference operation. For example, an instruction may be provided for access to a general menu (e.g., a menu including each conference operation), a specific menu (e.g., to determine the sequence number of the current conference, for to modify the chain of conferences at any time), and so on, or combinations thereof. For example, an instruction may appear between the instruction 348 and the instruction 349 to recite "Enter ***** to enter a general menu at any time. Enter ** to access a modification menu at any time. Enter * to delete the current conference at any time. Enter  conference sequence number  to delete the conference located at the sequence position at any time. Enter * access code, mapping key code * to add a new conference at any time. Enter  conference sequence number ** to shift the conference located at the sequence position back one position in the chain of conferences at any time." It should be understood that any instruction may be predetermined, modifiable, provided to the attendee over a communication channel via audio, text, video, and so on, or combinations thereof.

Figure 4:
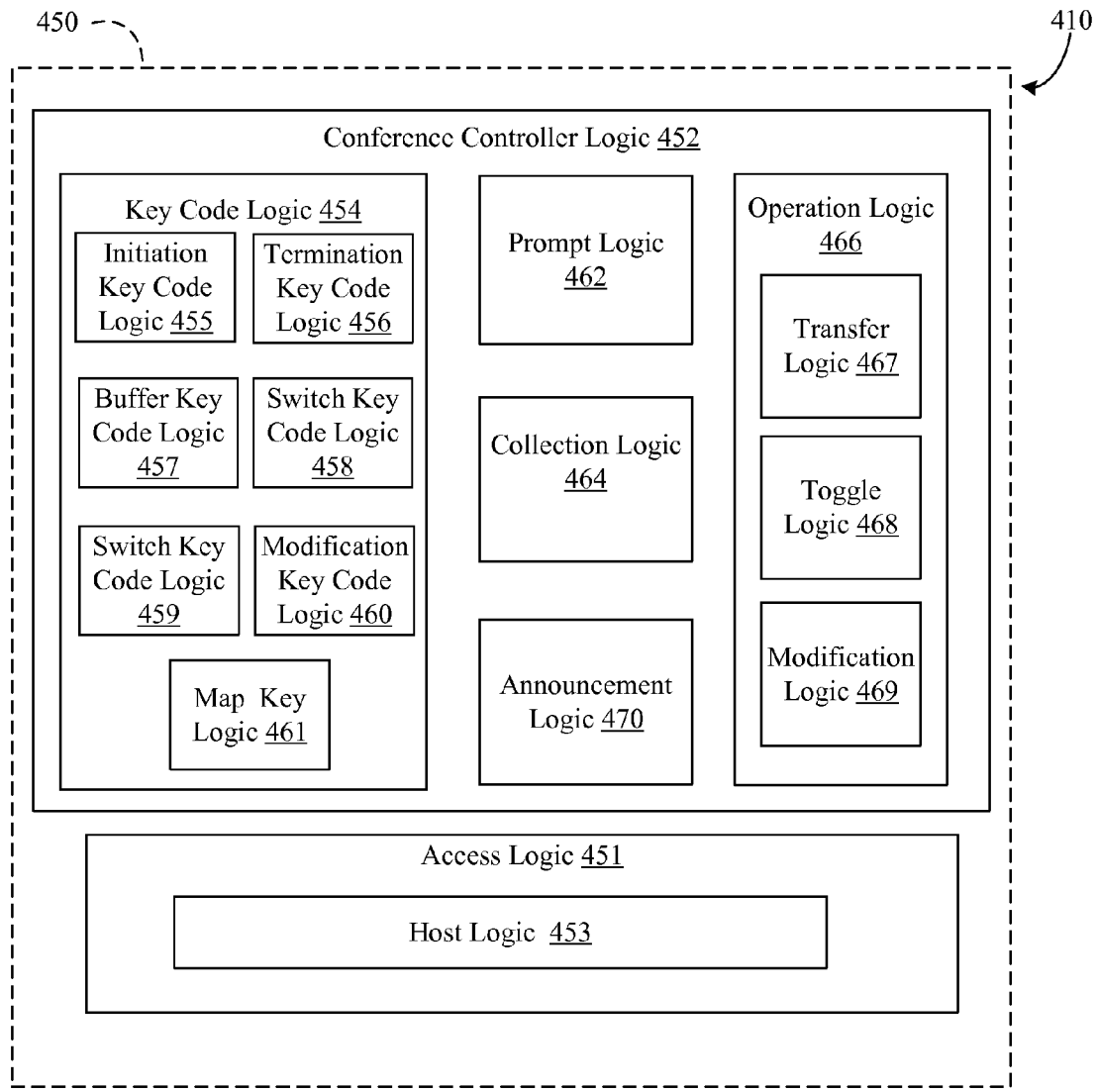
FIG. 4 is a block diagram of an example of an architecture including logic to facilitate conference operations according to an embodiment.

FIG. 4 shows a logic architecture 410 which may facilitate conference operations according to an embodiment. In the illustrated example, logic architecture 410 may include conference service logic 450 to facilitate communication between two or more parties (e.g., attendees) participating in a conference, to perform a conference operation (e.g., chaining, switching, modification, announcement, etc.), and so on, or combinations thereof. The illustrated conference service logic 450 includes conference controller logic 452.

In the illustrated example, the conference controller 452 includes key code logic 454. The illustrated key code logic 454 includes initiation key code logic 455, termination key code logic 456, buffer key code logic 457, mapping key code logic 458, switch key code logic 459, and modification key code logic 460 to identify an initiation key code, a termination key code, a buffer key code, a mapping key code, a switch key code, and a modification key code, respectively. The illustrated key code logic 454 also includes map key logic 461 to map a key sequence unique for authentication data (e.g., a key sequence of a mapping key code) with a specific key code (e.g., a key sequence of a switch key code). The illustrated map key logic 461 may further map any key code (e.g., a switch key code) with a physical hotkey of a conference device, such as a SIP telephone.

The illustrated conference controller logic 452 includes prompt logic 462. The illustrated prompt logic 462 may provide a dialog which may include an instruction including any data type, such as audio data, video data, text data, and so on, or combinations thereof. In one example, the instruction may prompt for a key code, such as the initiation key code, the termination key code, the buffer key code, the mapping key code, the switch key code, the modification key code, and so on, or combinations thereof. The instruction may prompt for any other key code, such as an announcement key code (e.g., to provide announcement information), a modification key code (e.g., to add a conference), a menu key code (e.g., to provide a general menu, a specific menu, etc.), a mute key code (e.g., to mute audio/video), and so on, or combinations thereof. In the illustrated example, key code logic 454 may recommend one more key codes to the prompt logic 462 to be used in the dialog. For example, the key code logic 454 may recommend the initiation key code to be used by the prompt logic 462 to prompt for the recommended initiation key code. The recommendation may be based on any criteria, such as available key codes, preferences, preset values, and so on, or combinations thereof.

The illustrated conference controller logic 452 includes collection logic 464. The illustrated collection logic 464 may identify authentication data, such as an access code. For example, the collection logic 464 may identify access codes which are consistent with the configuration of authentication data (e.g., a four digit number). The illustrated collection logic 464 may also maintain a collection of the authentication data for the plurality of distinct conferences to chain the conferences. In one example, the collection logic 464 may queue the authentication data. In addition, the key code logic 454 may identify one or more key codes and notify the collection logic 464. For example, the initiation key code logic 455 may identify the initiation key code and notify the collection logic 464, which may cause the collection logic 464 to start collecting the authentication data. The buffer key code logic 457 may identify the buffer key code and notify to the collection logic 464, which may facilitate identifying the start and/or the end of the authentication data by the collection logic 464. The mapping key code logic 455 may identify the mapping key code, notify the map key logic 461 to map the mapping key code, and/or notify the collection logic 464 which may facilitate identifying the start and/or the end of the authentication data by the collection logic 464. The termination key code logic 456 may identify the termination key code and notify the collection logic 464, which may cause the collection logic 464 to end the collection of the authentication data.

The illustrated conference controller logic 452 includes operation logic 466. The illustrated operation logic 466 includes transfer logic 467, which may perform a switch operation to transfer access from the current conference to a next succeeding conference in the chain of conferences when the current conference has ended, to transfer access to a conference spaced at a predetermined distance in the chain of conferences from the current conference when the current conference has ended, and so on, or combinations thereof. The illustrated operation logic 466 also includes toggle logic 468, which may perform a switch operation to cycle among conferences in the chain of conferences at any time. In one example, the toggle logic 468 may implement a general toggle operation, which may involve moving a predetermined distance in the chain of conferences from the current conference (e.g., a forward move by one conference, a backward move by two conferences, etc.). In another example, the toggle logic 468 may implement a specific toggle operation, which may involve moving from the current conference to a specific conference in the chain of conferences.

The illustrated operation logic 466 also includes modification logic 469, which may perform a modification operation for the chain of conferences. In one example, the modification logic 469 may add a conference to the chain of conferences, delete a conference in the chain of conferences, reorder the conferences (e.g., each of the conferences, a subset, etc.) in the chain of conferences, and so on, or combinations thereof. The modification logic 469 may utilize data corresponding to a modifying conference (e.g., a conference to be added) to perform the modification, for example by using a sequence number and/or a specific key code for the modifying conference. The modification logic 469 may delete and/or reorder the current conference automatically, for example on encountering the modification key code. The modification logic 469 may utilize authentication data (e.g., new authentication data for a new conference, prior authentication data for a conference in the chain of conferences, etc.) to identify a conference to add, to delete, to reorder, and so on, or combinations thereof.

In the illustrated example, the key code logic 454 may identify one or more key codes and notify the operation logic 466. In one example, the switch key code logic 459 may identify a switch key code including a generic key code and notify the operation logic 466, which may cause the transfer logic 467 to implement the generic transfer operation. In another example, the switch key code logic 459 may identify a switch key code including a generic key code and notify the operation logic 466, which may cause the toggle logic 468 to implement the generic toggle operation. The switch key code logic 459 may also identify a switch key code including the specific key code and notify the operation logic 466, which may cause the toggle logic 468 to implement the specific toggle operation. Moreover, the modification key code logic 460 may identify a modification key code and notify the operation logic 466, which may cause the modification logic 469 to implement the modification operation (e.g., add a conference, delete a conference, reorder a conference, etc.).

The illustrated conference controller logic 452 includes announcement logic 470. The illustrated announcement logic 470 may perform an announcement to provide information corresponding to the current conference. In one example, the information may include the title of the current conference, the subject of the current conference, and so on, or combinations thereof. It should be understood that the conference controller logic 452 may include any logic to identify, recommend, and/or perform a notification for any key code, such as an announcement key code, a menu key code, and so on, or combinations thereof. Accordingly, for example, the key code logic 454 may identify an announcement key code and notify the announcement logic 470, which may cause the announcement logic 470 to announce the information corresponding to the current conference.

The illustrated conference service 450 includes access logic 451 to provide access to a conference in the chain of conferences. The illustrated access logic 451 includes host logic 453 to host each of the conferences in the chain of conferences. In one example, the host logic 453 may establish and/or maintain a connection with one or more user interfaces. For example, a conference attendee may utilize a respective user interface to establish and/or maintain a connection with the host logic 453 over a communication channel, such as a TCP channel, a UDP channel, a PSTN channel, and so on, or combinations thereof. The access logic 451 may respond to data and/or a control signal from the collection logic 464, the operation logic 466, and so on, or combinations thereof. For example, the authentication data enqueued first may be initially dequeued in a first-in-first-out (FIFO) manner to cause the access logic 451 to provide access to the conference associated with the authentication data enqueued first. In another example, the authentication data enqueued second may be utilized to cause the access logic 451 to provide access to the conference associated with the authentication data enqueued second when the operation logic 466 performs a switch operation via the toggle logic 468.

Figure 5:
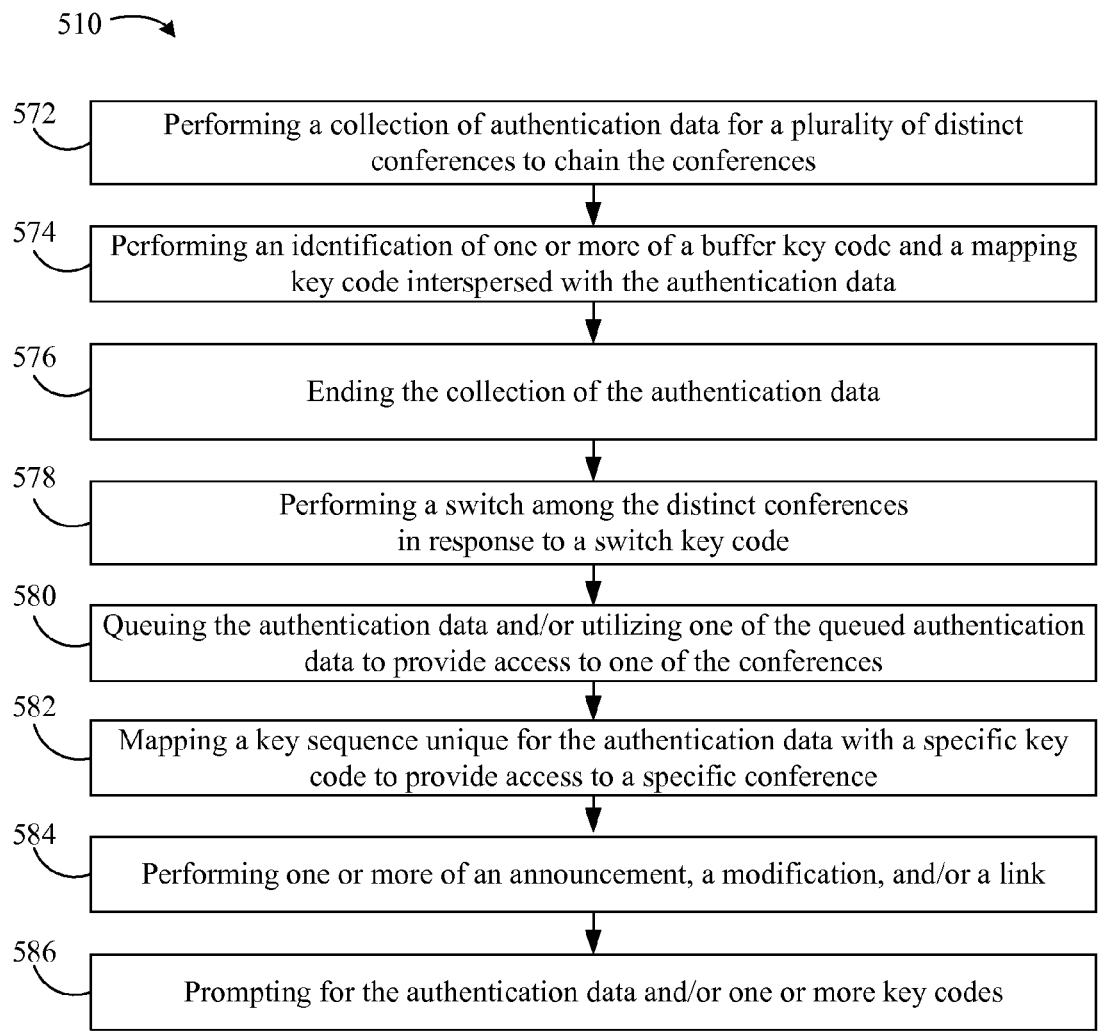
FIG. 5 is a flowchart of an example of a method to facilitate conference operations according to an embodiment.

FIG. 5 shows a method 510 to facilitate conference operations according to an embodiment. Illustrated processing block 572 provides for starting to perform a collection of authentication data for a plurality of distinct conferences to chain the conferences. In one example, the authentication data may include an access code (e.g., a pin number, a bridge number, etc.). The collection of the authentication data may start in response to an initiation key code. Thus, the collection at the block 572 may correspond to, for example, the collection of authentication data (e.g., FIG. 1 to FIG. 4) already discussed. Illustrated processing block 574 provides performing an identification of one or more of a buffer key code and a mapping key code interspersed with the authentication data. In one example, the buffer key code may include a general key sequence demarcating the authentication data in the collection. In another example, the mapping key code may include a key sequence unique for the authentication data. Thus, the identification of the buffer key code and/or the mapping key code at the block 574 may correspond to, for example, the identification (e.g., FIG. 1 to FIG. 4) already discussed. The collection of the authentication data may end at block 576. For example, the collection may end in response to a termination key code. Thus, ending the collection at the block 576 may correspond to, for example, ending the collection (e.g., FIG. 1 to FIG. 4) already discussed.

Illustrated processing block 578 provides for performing a switch among the distinct conferences in response to a switch key code. In one example, the switch key code may include a general key code applicable to each of the conferences. In another example, the switch key code may include a specific key code applicable to a specific conference. Thus, performing the switch among the distinct conferences at the block 578 may correspond to, for example, the switch among the distinct conferences (e.g., FIG. 1 to FIG. 4) already discussed.

Illustrated processing block 580 provides for queuing authentication data, for example queuing each access code, and/or utilizing one of the queued authentication data (e.g., one of the queued access codes) to provide access to one of the conferences. In one example, one of the queued access codes may be utilized in response to a general key code. Thus, queuing the authentication data and/or utilizing one of the queued authentication data at the block 580 may correspond to, for example, the queuing and/or the utilization (e.g., FIG. 1 to FIG. 4) already discussed. Illustrated processing block 582 provides for mapping the key sequence unique for the authentication data with the specific key code to provide access to the specific conference. Thus, the mapping at the block 582 may correspond to, for example, the mapping (e.g., FIG. 1 to FIG. 4) already discussed.

Illustrated processing block 584 provides for performing one or more of an announcement, a modification, and/or a link. In one example, the announcement may include information corresponding to the plurality of distinct conferences such as a conference title and/or a conference subject. The modification may occur in response to a modification key code. The modification may include one or more of an addition of a conference, a deletion of a conference, a reordering of a conference, and so on, or combinations thereof. The link may and be performed between a key code (e.g., the switch key code) and a physical hotkey of a conference device, such as a VoIP phone. Thus, performing one or more of the announcement, the modification, and the linking at the block 584 may correspond to, for example, the announcement, the modification, and the linking (e.g., FIG. 1 to FIG. 4) already discussed.

Illustrated processing block 586 provides for prompting for the authentication data and/or one or more key codes. In one example, the one or more key codes may include an initiation key code, a buffer key code, a mapping key code, a termination key code, a switch key code, an announcement key code, a modification key code, a menu key code, and so on, or combinations thereof. Thus, prompting for the authentication data and/or one or more of the key codes at the block 586 may correspond to, for example, prompting for the authentication data and/or one or more of the key codes (e.g., FIG. 1 to FIG. 4) already discussed.

Figure 6:
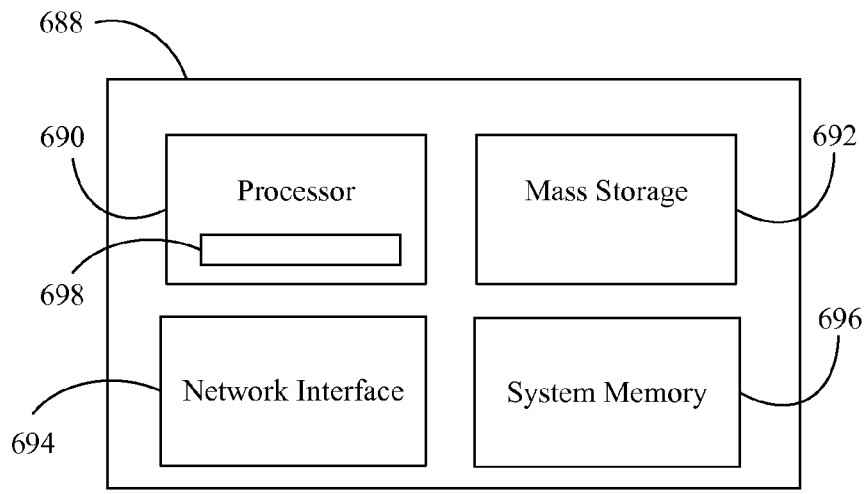
FIG. 6 is a block diagram of an example of a computing device according to an embodiment.

FIG. 6 shows a computing device 688 having a processor 690, mass storage 692 (e.g., read only memory/ROM, optical disk, flash memory), a network interface 694, and system memory 696 (e.g., random access memory/RAM). In the illustrated example, the processor 690 is configured to execute logic 698, wherein the logic 698 may implement one or more aspects of the schemes 10 and/or 210 (FIG. 1 to FIG. 2), the dialog 310 (FIGS. 3A to 3D), the architecture 410 (FIG. 4), and/or the method 510 (FIG. 5), already discussed.

Thus, the logic 698 may facilitate a conference operation, such as conference chaining, conference switching, conference modification, conference announcement, and so on, or combinations thereof. The logic 698 may also be implemented as a software application that is distributed among many computers (e.g., local or remote). Thus, while a single computer could provide the functionality described herein, systems implementing these features can use many interconnected computers (e.g., for scalability as well as modular implementation).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A conference device comprising:
   a network interface to exchange conference data associated with a plurality of distinct conferences; and
   a user interface to:
   prompt for one or more of an initiation key code, authentication data, a termination key code, and a switch key code;
   input the initiation key code to start a collection of the authentication data for the plurality of distinct conferences to chain the conferences;
   input the termination key code to end the collection of the authentication data; and
   input the switch key code to switch among the distinct conferences, wherein the switch key code is to include one or more of a general key code applicable to each of the conferences and a specific key code applicable to a specific conference.

2. The conference device of claim 1, wherein the user interface is to include one or more of a command line interface, a graphical user interface, and a hardwired keypad interface.

3. The conference device of claim 2, wherein one or more of the initiation key code, the termination key code, and the switch key code are to be linked with a hotkey of the conference device.

4. The conference device of claim 3, wherein at least the switch key code is to be linked with a physical hotkey of the conference device.

5. A computer program product comprising:
a computer readable storage medium; and
computer usable code stored on the computer readable storage medium, where, if executed by a processor, the computer usable code causes a computer to:
prompt for one or more of an initiation key code, authentication data, a termination key code, and a switch key code;
input the initiation key code to start a collection of the authentication data for a plurality of distinct conferences to chain the conferences;
input the termination key code to end the collection of the authentication data; and
input the switch key code to switch among the distinct conferences, wherein the switch key code is to include one or more of a general key code applicable to each of the conferences and a specific key code applicable to a specific conference.

6. The computer program product of claim 5, wherein the initiation key code is to include a key sequence defining one or more of a transfer operation and a toggle operation.

7. The computer program product of claim 5, wherein the authentication data is to include an access code for each of the conferences, and wherein the computer usable code, if executed, further causes a computer to queue each access code and utilize one of the queued access codes in response to the general key code to provide access to one of the conferences.

8. The computer program product of claim 5, wherein the authentication data is to include an access code for each of the conferences, and wherein the computer usable code, if executed, further causes a computer to perform the switch in response to the specific key code to provide access to the specific conference.

9. The computer program product of claim 5, wherein the computer usable code, if executed, further causes a computer to perform an announcement including information corresponding to the plurality of distinct conferences, wherein the information is to include one or more of a conference title and a conference subject.

10. The computer program product of claim 5, wherein the computer usable code, if executed, further causes a computer to perform a modification in response to a modification key code, wherein the modification is to include one or more of an addition of a conference, a deletion of a conference, and a reordering of a conference.

11. The computer program product of claim 5, wherein the computer usable code, if executed, further causes a computer to perform a link between the switch key code and a hotkey of a conference device.

12. A method comprising:
prompting for one or more of an initiation key code, authentication data, a termination key code, and a switch key code;
inputting the initiation key code to start a collection by a processor of the authentication data for a plurality of distinct conferences to chain the conferences;
inputting the termination key code to end the collection by the processor of the authentication data; and
inputting the switch key code to switch among the distinct conferences by the processor, wherein the switch key code is to include one or more of a general key code applicable to each of the conferences and a specific key code applicable to a specific conference.

13. The method of claim 12, wherein the initiation key code is to include a key sequence defining one or more of a transfer operation and a toggle operation.

14. The method of claim 12, wherein the authentication data is to include an access code for each of the conferences, and wherein the method further includes one or more of:
queuing each access code and utilizing one of the queued access codes in response to the general key code to provide access to one of the conferences; and
performing the switch in response to the specific key code to provide access to the specific conference.

15. The method of claim 12, further including performing an announcement including information corresponding to the plurality of distinct conferences, wherein the information includes one or more of a conference title and a conference subject.

16. The method of claim 12, further including performing a modification in response to a modification key code, wherein the modification is to include one or more of an addition of a conference, a deletion of a conference, and a reordering of a conference.

17. The method of claim 12, further including performing a link between the switch key code and a hotkey of a conference device.

18. A conference device comprising:
a network interface to exchange conference data associated with a plurality of distinct conferences; and
a user interface to:
input an initiation key code to start a collection of authentication data for the plurality of distinct conferences to chain the conferences, wherein the authentication data is to include an access code for each of the conferences;
input a termination key code to end the collection of the authentication data; and
input a switch key code to switch among the distinct conferences, wherein the switch key code is to include one or more of a general key code applicable to each of the conferences and a specific key code applicable to a specific conference, and wherein the conference device is to perform one or more of:
queue each access code and utilize one of the queued access codes in response to the general key code to provide access to one of the conferences; and
the switch in response to the specific key code to provide access to the specific conference.

19. A computer program product comprising:
a computer readable storage medium; and
computer usable code stored on the computer readable storage medium, where, if executed by a processor, the computer usable code causes a computer to:
input an initiation key code to start a collection of authentication data for a plurality of distinct conferences to chain the conferences, wherein the authentication data is to include an access code for each of the conferences;
input a termination key code to end the collection of the authentication data; and
input a switch key code to switch among the distinct conferences, wherein the switch key code is to include one or more of a general key code applicable to each of the conferences and a specific key code applicable to a specific conference, and wherein the computer is to perform one or more of:
  queue each access code and utilize one of the queued access codes in response to the general key code to provide access to one of the conferences; and
  perform the switch in response to the specific key code to provide access to the specific conference.

20. A method comprising:
inputting an initiation key code to start a collection by a processor of authentication data for a plurality of distinct conferences to chain the conferences, wherein the authentication data includes an access code for each of the conferences;
inputting a termination key code to end the collection by the processor of the authentication data; and
inputting a switch key code to switch among the distinct conferences by the processor, wherein the switch key code is to include one or more of a general key code applicable to each of the conferences and a specific key code applicable to a specific conference, and wherein the processor performs one or more of:
  queuing each access code and utilizing one of the queued access codes in response to the general key code to provide access to one of the conferences; and
  the switching in response to the specific key code to provide access to the specific conference.

21. A conference device comprising:
a network interface to exchange conference data associated with a plurality of distinct conferences; and
a user interface to:
  input an initiation key code to start a collection of authentication data for the plurality of distinct conferences to chain the conferences;
  input a termination key code to end the collection of the authentication data; and
  input a switch key code to switch among the distinct conferences, wherein the switch key code is to include one or more of a general key code applicable to each of the conferences and a specific key code applicable to a specific conference, and wherein one or more of the initiation key code, the termination key code, and the switch key code are to be linked with a hotkey of the conference device.

22. A computer program product comprising:
a computer readable storage medium; and
computer usable code stored on the computer readable storage medium, where, if executed by a processor, the computer usable code causes a computer to:
input an initiation key code to start a collection of authentication data for a plurality of distinct conferences to chain the conferences;
input a termination key code to end the collection of the authentication data; and
input a switch key code to switch among the distinct conferences, wherein the switch key code is to include one or more of a general key code applicable to each of the conferences and a specific key code applicable to a specific conference, and wherein one or more of the initiation key code, the termination key code, and the switch key code are to be linked with a hotkey of a conference device.

23. A method comprising:
inputting an initiation key code to start a collection by a processor of authentication data for a plurality of distinct conferences to chain the conferences;
inputting a termination key code to end the collection by the processor of the authentication data; and
inputting a switch key code to switch among the distinct conferences by the processor, wherein the switch key code is to include one or more of a general key code applicable to each of the conferences and a specific key code applicable to a specific conference, and wherein one or more of the initiation key code, the termination key code, and the switch key code are linked with a hotkey of a conference device.

* * * * *